No. 792,527. PATENTED JUNE 13, 1905.
H. LOCKWOOD.
PARING KNIFE.
APPLICATION FILED NOV. 1, 1904.
Fig. 1
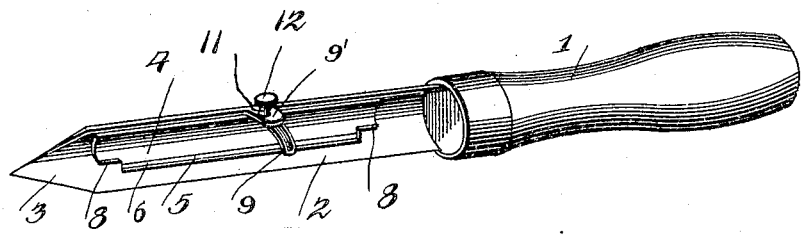
Fig. 2.
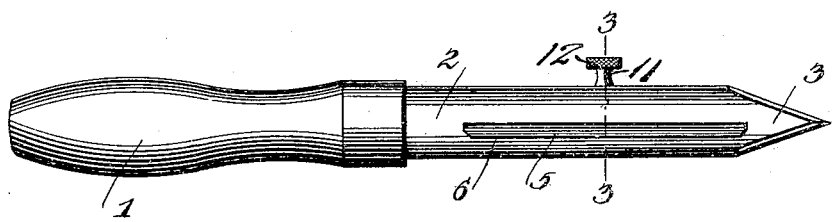
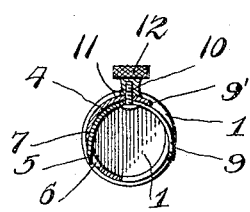
Fig. 3.
Witnesses
Frank W. Hough
C. C. Hines.
Inventor
Harry Lockwood,
By Victor J. Evans.
Attorney No. 792,527. Patented June 13, 1905.

UNITED STATES PATENT OFFICE.

HARRY LOCKWOOD, OF JACKSON, MICHIGAN.

PARING-KNIFE.

SPECIFICATION forming part of Letters Patent No. 792,527, dated June 13, 1905.

Application filed November 1, 1904. Serial No. 231,001.

*To all whom it may concern:*

Be it known that I, HARRY LOCKWOOD, a citizen of the United States, residing at Jackson, in the county of Jackson and State of Michigan, have invented new and useful Improvements in Paring-Knives, of which the following is a specification.

This invention relates to improvements in paring-knives for paring fruits or vegetables, the objects in view being to provide a knife of this character which possesses superior qualities with respect to a more efficient capability of action to pare or remove the skins of fruits or vegetables with a minimum waste in the removal of the substance of the body of the fruit or vegetable and also in the facility with which it may be handled to decrease the labor of paring and sharpened to keep its cutting edge in perfect condition for use.

The invention consists in the features of construction, combination, and arrangement of parts hereinafter more fully described and particularly pointed out in the appended claims, reference being had to the accompanying drawings, in which—

Figure 1 is a perspective view of a paring-knife embodying my invention looking toward the concave side of the body of the knife. Fig. 2 is a similar view looking toward the convex side of the body and showing the slot therein and cutting edge of the paring-blade, and Fig. 3 is a cross-section on the line 3 3 of Fig. 2.

Referring to the drawings by reference-numerals, 1 represents a suitable handle, to which is secured one end of a concavo-convex blade 2, the opposite end of which is pointed or otherwise suitably reduced and sharpened to form a cutting portion 3, which may be employed for pitting and removing eyes and other bad spots on fruits and vegetables.

The blade 2 forms the body portion proper of the paring-knife, and disposed within the chamber formed upon the concaved side thereof is a concavo-convex cutting-blade 4, having upon one of its side edges a cutting edge or projection 5, which extends through a longitudinal slot 6, formed in the side and adjacent to the lower edge of the body 2. The inner surface of the body 2, adjacent to the upper portion of the slot 6, is beveled or tapered, as indicated at 7, to facilitate adjustment of the blade 4 and adapt the cutting edge 5 to project at a point sufficiently above the body wall of the slot 6 to leave an intervening space or passage through which the parings may feed to the concave portion of the body 5 and thence discharge, this operation preventing the parings or peelings from accumulating around the cutting edge of the blade or outer surface of the knife and interfering with the cutting action of said blade and the proper manipulation of the knife. The cutting edge 5 terminates at each end inside the adjacent end of the body of the blade 4 to cause the production of shoulders 8, which extend beyond the end portions or limits of the slots 6 to form extended guide portions and stops to limit the outward projection of said cutting edge. From the upper edge of the blade 4—namely, at the opposite side edge of said blade from the cutting edge 5—extends an arc-shaped slotted projection 9, through which passes a screw 10, the head of said screw being arranged to bear against the under side of said extension and the shank thereof projecting upward through an apertured ear or extension 9' on the body 2 and receiving a clamping-nut 11, whereby the screw may be drawn upwardly to hold the blade 4 firmly in adjusted position. The nut 11 is provided with a knurled or milled head 12, by which it may be conveniently turned to clamp and release the blade 4. It will be observed that this construction permits the blade 4 to be adjusted in the arc of a circle to the extent of the limit of the slot in said extension 9 to adapt the cutting edge 5 to be projected at intervals to compensate for reductions in its surface by repeated sharpenings. By this form of fastening connection also the blade 4 may be adjusted to project the cutting edge 5 a sufficient distance to enable it to be sharpened without removing it from the body 2. The form of the body 2, and particularly of its tapered portion 7, is such as to facilitate this operation and to adapt the blade 4 to lie so that its cutting portion 5 always projects at an angle to the plane of the slot 6 to preserve or form the passage referred to to permit the parings or peelings to pass to the interior of the body 4 and thence discharge.

In addition to the advantages above set forth it will also be apparent that in using the knife for paring fruits or vegetables the peculiar form of the body 2 permits the same to have a rolling bearing upon the surface of the fruit or vegetable and to thereby enable the operator to conveniently regulate the position of the cutting edge of the blade 4 to suit the peculiarities in form or configuration of the fruit or vegetable which is being pared, thus adapting the knife to be so controlled or regulated in its action that the cutting edge 5 will cleanly and easily remove the skin of the fruit or vegetable without cutting down to any material extent into the substance of the body of the vegetable, thus preventing the waste attendant upon the use of paring-knives of ordinary construction. During the operation of paring or peeling the cuttings feed through the slot 6 to the concavity or chamber formed by the concavo-convex body 2, and the latter thus forms a guard or housing to prevent the same from becoming entangled with the cutting-blade or interfering with the free manipulation of the cutting-knife by the user. As fast as the paring-blade is reduced by sharpening it may be adjusted to its proper operative position by loosening the thumb-nut 12 and adjusting the blade 4 by means of its slotted extension 9, after which the parts may be firmly fastened together again by tightening the nut 12, as will be readily understood. Owing to the peculiar form of the body 2 and blade 4 and the advantages derived therefrom the knife is adapted to peel or pare much faster than ordinary knives and with less inconvenience to the user.

From the foregoing description, taken in connection with the accompanying drawings, the construction and mode of operation of the invention will be understood without a further extended description. Changes in the form, proportions, and minor details of construction may be made within the scope of the invention without departing from the spirit or sacrificing any of the advantages thereof.

Having thus fully described the invention, what is claimed as new is—

1. A paring-knife having a concavo-convex body provided with a slot therein, the concaved side of said body adjacent to one of the walls of said slot being tapered or inclined, a concavo-convex blade disposed upon the concaved side of the body and having a cutting edge projecting through said slot and retained at a determined angle thereto by the said tapered portion of the body, said blade also being provided with shoulders beyond its cutting edge to limit the projection of said edge, and means for adjustably securing the blade to the body.

2. A paring-knife having a concavo-convex body provided with a slot therein, a concavo-convex blade disposed within the concaved side of said body and formed with a cutting edge projecting through said slot, said blade being further formed with shoulders beyond the ends of the slot to limit the projection of its cutting edge, and means for adjustably securing the blade to the body, substantially as described.

3. A paring-knife having a concavo-convex body provided with a slot therein, the concaved side of said body being tapered or inclined adjacent to one of the walls of said slot, a concavo-convex blade disposed within the concaved side of the body and having a cutting edge projecting through said slot and bearing against said tapered portion, and also having shoulders beyond its cutting edge to engage the body and limit the projection of the blade, an arcuate slotted extension upon one of the edges of the blade, and means cooperating with said extension for adjustably connecting the blade to the body to adapt the blade to be adjusted in an arcuate path.

In testimony whereof I affix my signature in presence of two witnesses.

HARRY LOCKWOOD.

Witnesses:
 JOHN C. WENGER,
 GEORGE R. STONE.